N. H. MOTSINGER.
ROTARY ENGINE.
APPLICATION FILED FEB. 10, 1909.
960,990.
Patented June 7, 1910.
5 SHEETS—SHEET 1.
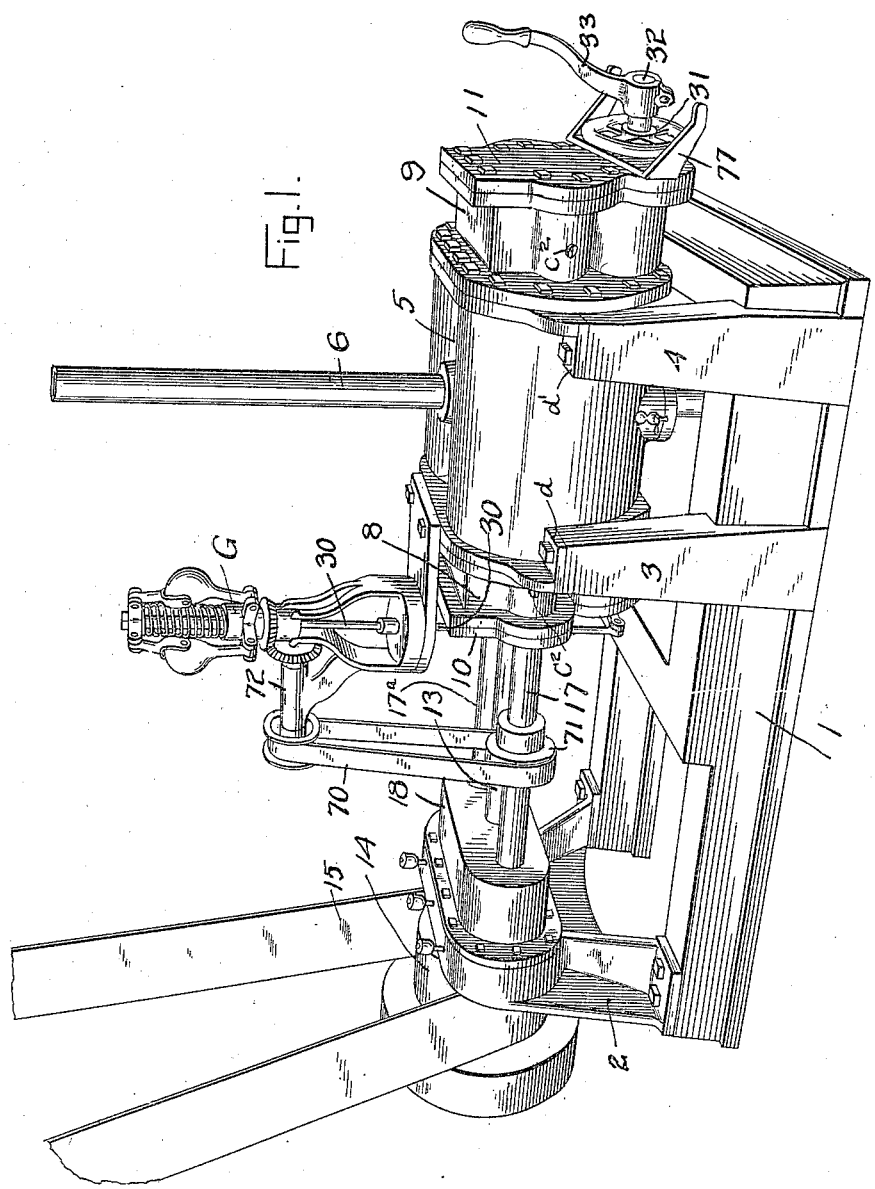
WITNESSES
O. K. Reichenbach
L. C. Price.
INVENTOR
Newell H. Motsinger,
per E. W. Bradford
Attorney

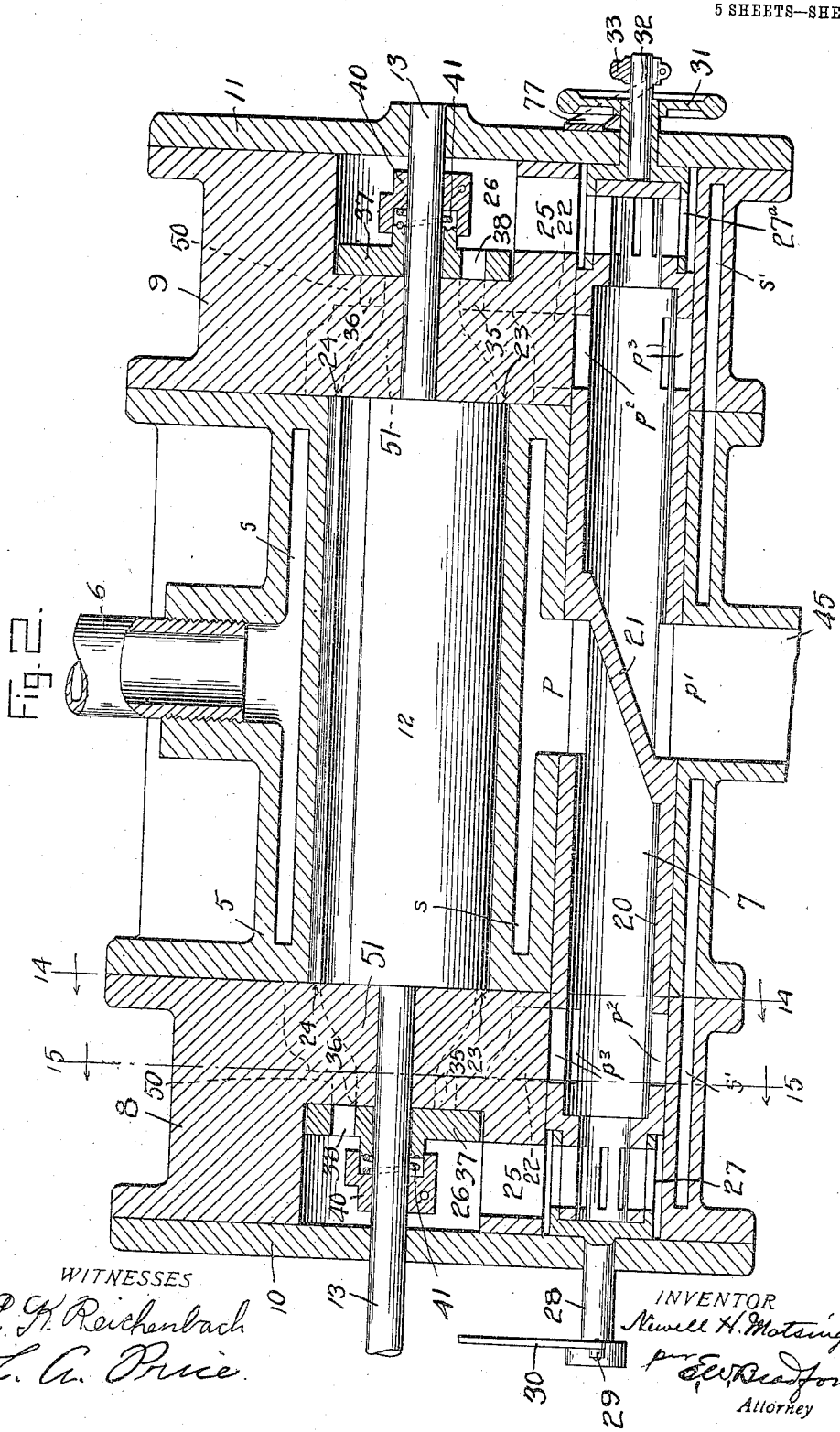

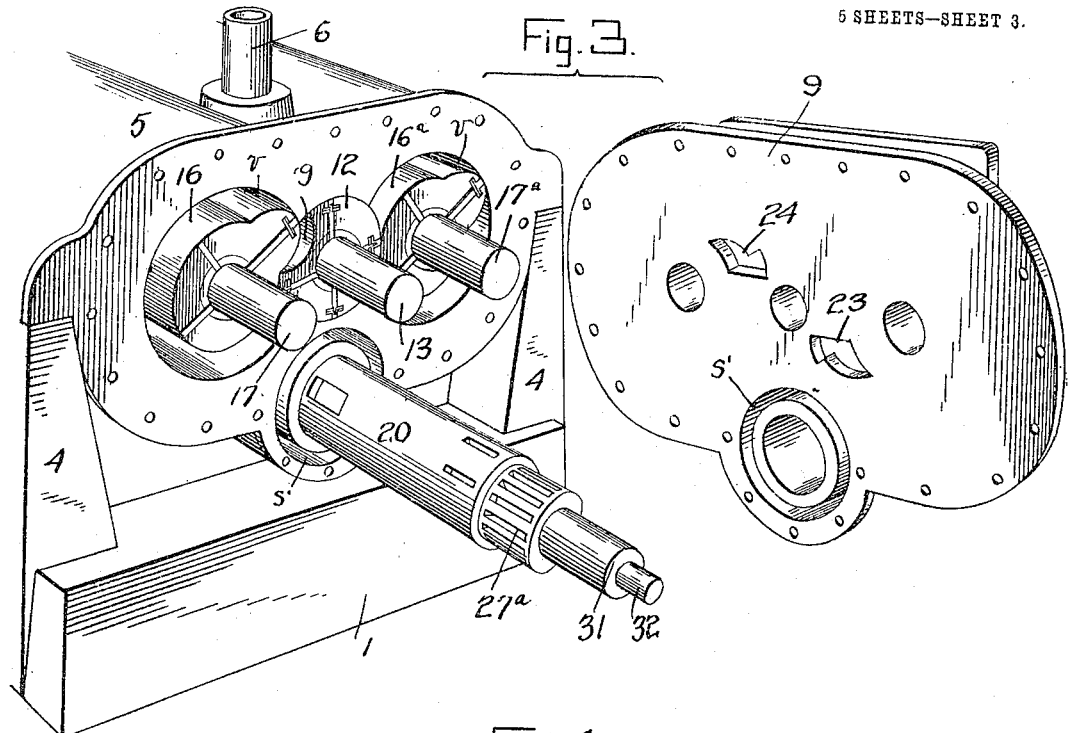
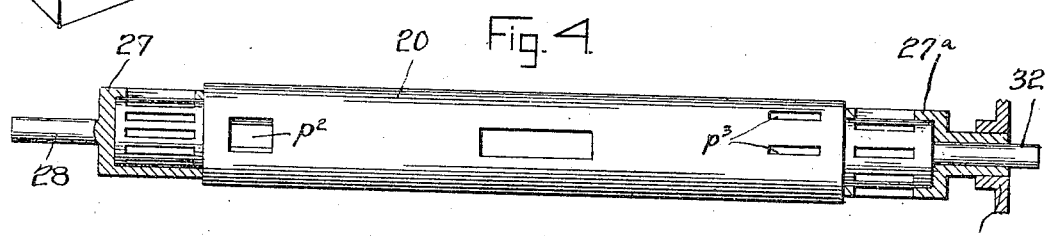
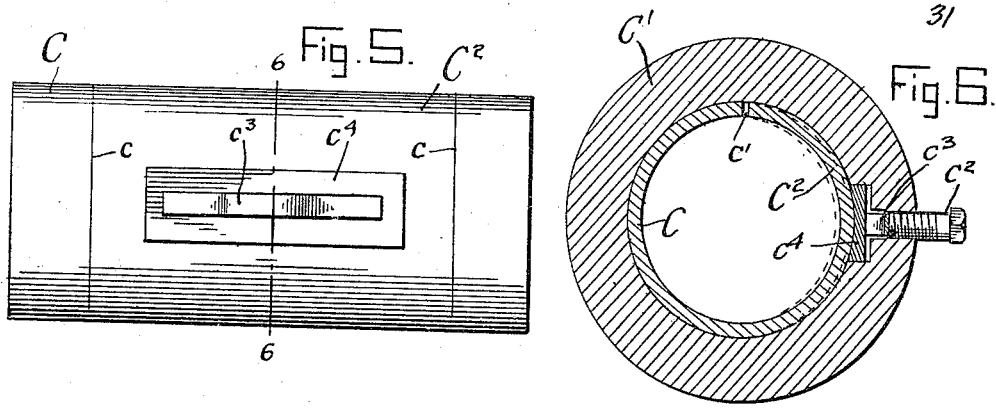

N. H. MOTSINGER.
ROTARY ENGINE.
APPLICATION FILED FEB. 10, 1909.
960,990.
Patented June 7, 1910.
5 SHEETS—SHEET 4.
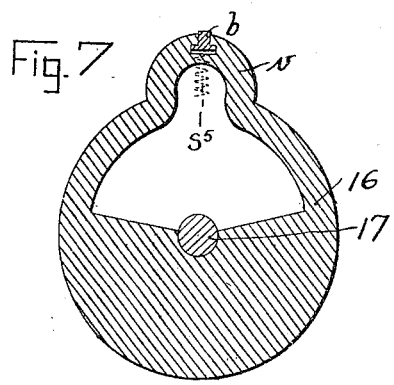
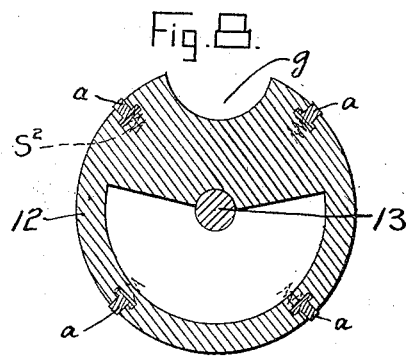
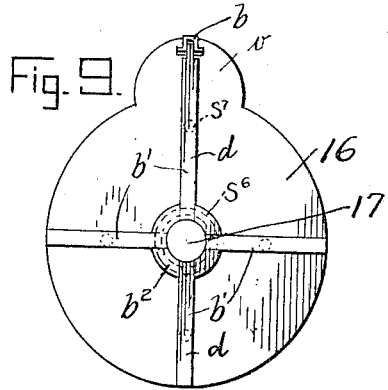
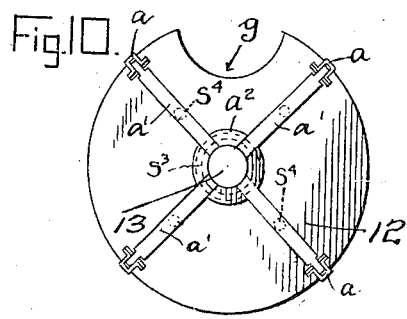
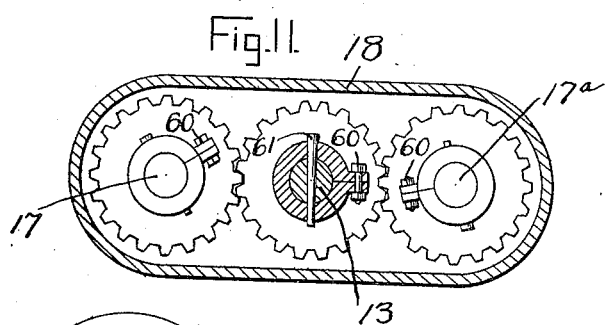
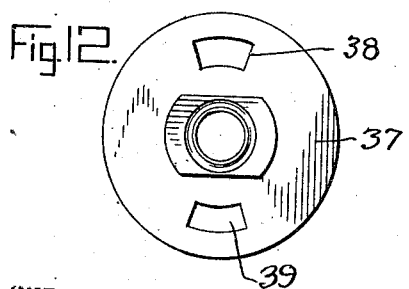
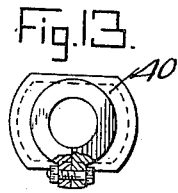
WITNESSES
INVENTOR

N. H. MOTSINGER.
ROTARY ENGINE.
APPLICATION FILED FEB. 10, 1909.

960,990.

Patented June 7, 1910.
5 SHEETS—SHEET 5.

Witnesses
C. K. Reichenbach.
L. A. Price.

Inventor
Newell H. Motsinger
By E. W. Bradford
Attorney

UNITED STATES PATENT OFFICE.

NEWELL H. MOTSINGER, OF GREENSBURG, PENNSYLVANIA.

ROTARY ENGINE.

960,990.  Specification of Letters Patent.  Patented June 7, 1910.

Application filed February 10, 1909. Serial No. 477,225.

*To all whom it may concern:*

Be it known that I, NEWELL H. MOTSINGER, a citizen of the United States, residing at Greensburg, in the county of Westmoreland and State of Pennsylvania, have invented certain new and useful Improvements in Rotary Engines, of which the following is a specification.

My said invention consists in various improvements in the details of construction of rotary engines of that particular class shown and described in my former patents and applications for patents, whereby the construction is simplified and rendered more perfect in operation, all as will be hereinafter more fully described and claimed.

Figure 14:
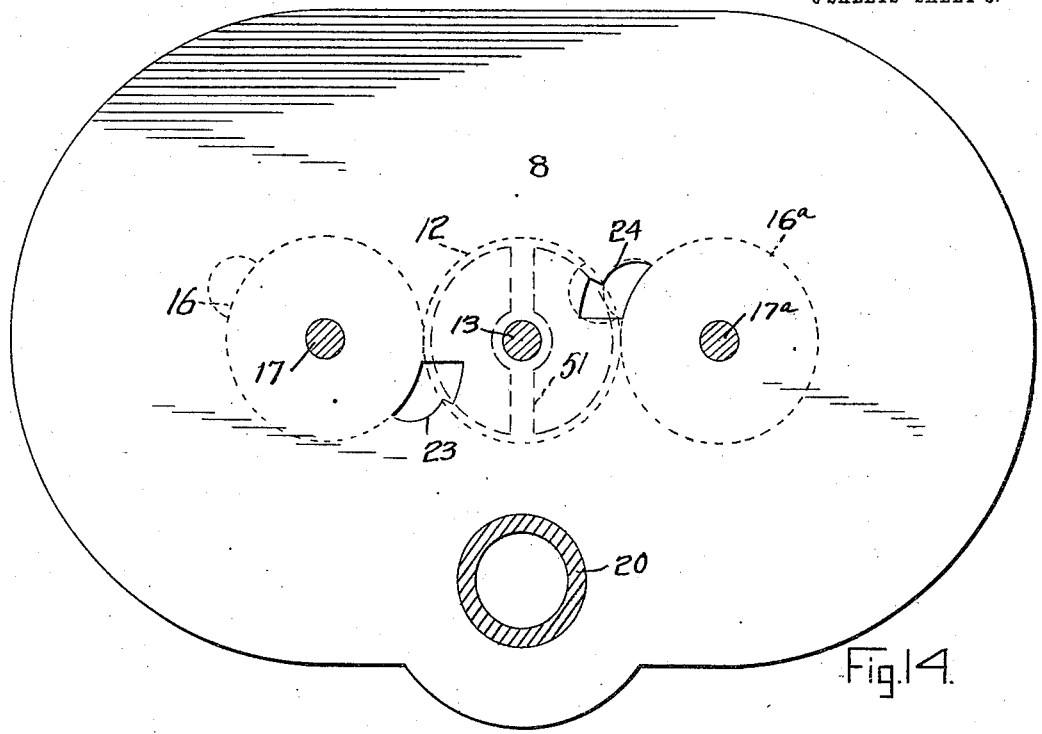
Figure 15:
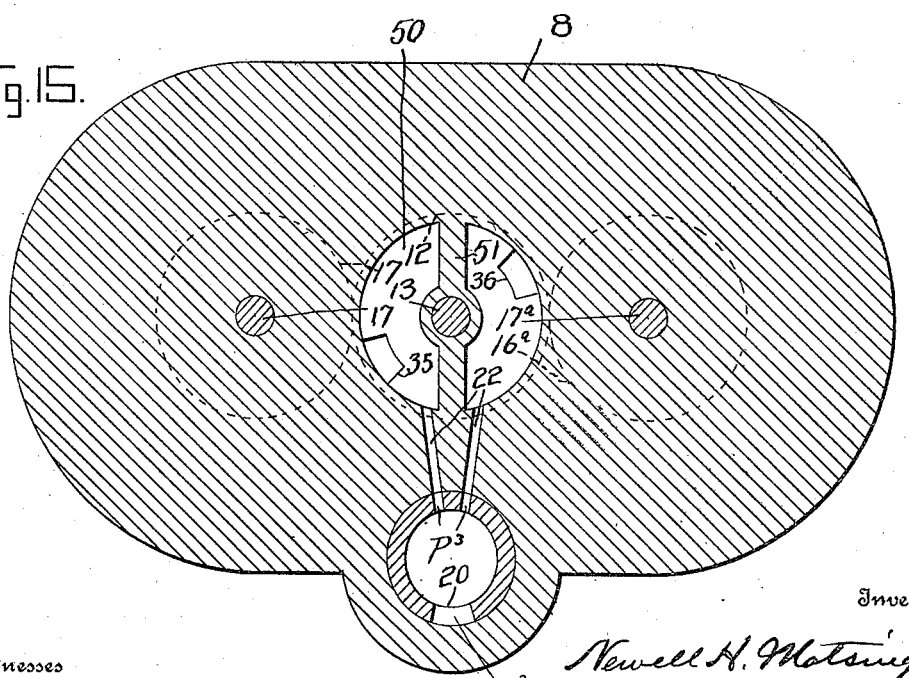

Referring to the accompanying drawings which are made a part hereof and on which similar reference characters indicate similar parts, Figure 1 is a perspective view of my engine of the improved construction, Fig. 2 a central longitudinal section through the engine casing and contained parts, Fig. 3 a perspective view of one end of the engine casing with the head removed, showing the interior construction and arrangement, Fig. 4 a view partly in elevation and partly in section of the reversing valve and governor devices thereon, Fig. 5 a side elevation of the bushing or lining for the bearings in which the rotor side shafts are journaled, Fig. 6 a cross section as on the dotted line 6—6 in Fig. 5, showing the brass and lining, Fig. 7 a cross section through one of the male or side rotors, Fig. 8 a similar view through the female or central rotor, Fig. 9 an end elevation of the male rotor, Fig. 10 an end elevation of the female rotor, Fig. 11 a section through gear box 18 in Fig. 1, Fig. 12 an elevation of plate 37, Fig. 13 an elevation of collar 40, Fig. 14 a cross section looking in the direction of the arrows from the dotted line 14—14 in Fig. 2, and Fig. 15 a similar view on the dotted line 15—15 in the same figure.

The engine frame or support comprises a base 1 of suitable form and construction to support the various parts of the engine. At one end it is provided with a bracket 2 supporting the bearings for the outer ends of the rotor shafts and the gear casing 18, and at its opposite end it is provided with upright brackets 3 and 4 to support the engine flanges $d\ d'$ on the sides of the engine casing at each end thereof, said flanges being adapted to rest thereon and be bolted thereto.

The engine proper comprises a casing 5 containing three bores, the axes of which are in the same plane, the central bore being of a size to accommodate the diameter of the female rotor and the bores on each side of a size to accommodate the male rotors on which are formed the vanes. Said casing is formed with a steam space $s$ which surrounds the bores containing the rotors and with which the steam inlet pipe 6 connects on one side. Another bore is formed in said casing immediately beneath the central bore on which the reversing valve 20 is mounted. The steam space in the casing also surrounds the bore containing said reversing valve and extends into the heads as at $s'$ as shown most clearly in Figs. 2 and 3. By reason of said steam spaces being formed in the inlet path of the steam the metal of the casing is warmed and expanded before the rotors or valve are rotated and any binding caused by the contraction of the metal in cooling is avoided. Said casing 5 is provided with heads 8 and 9 bolted to each end and cored out to provide chambers and ports for the inlet and exhaust of the steam as will be presently described. Outside plates, or caps, 10 and 11 cover said chambers in said heads. The female rotor 12 is mounted in the central bore in the casing and is formed with a longitudinal groove $g$. It is also provided with longitudinal grooves containing packing strips $a$ located at points 90° apart around its periphery, two of said strips being equi-distant from each side of the groove $g$. Said grooves and strips are preferably T-shaped in cross section, as best shown in Fig. 8, the head of the T being the bottom of the groove and the strips slid into them from their ends. Springs $s^2$ are seated underneath said strips to hold them outwardly into contact with the surface of the bore containing the rotor. Packing strips $a'$ are also mounted in T-shaped grooves extending radially across the ends of the rotor to intersect the strips $a$, the ends of which are notched to receive tongues on the outer ends of said strips $a'$. A circular recess is formed in each end around the shaft in which a packing ring $a^2$ is mounted, the outer face of said rings being formed with radial notches to receive the inner ends of strips $a'$ (see Fig. 10). A coiled spring $s^3$ is mounted under each ring $a^2$ and a spring $s^4$ under each radial strip $a'$ near its outer end, thus providing for keeping said packing in close contact with the adjacent faces of the heads at all times and prevent the steam from leaking across from one chamber to the other. The part of the grooves forming the head of the T is somewhat thicker than the corresponding portion of the packing strips, in both instances, to provide for the outward movement of said strips, as will be readily understood. The rotor is hollow but has sufficient metal on the side of the groove to balance it and give it a uniform centrifugal action on all sides of its axis. Said rotor is provided with a shaft 13 which is journaled in suitable bearings in the heads 8 and 9 and also in the bracket 2 through which it extends and is provided on its outer end with a pulley, or gear, 14 from which it is geared by a belt 15 to the power shaft which it is designed to drive.

The male rotors 16, $16^a$ are mounted in the side bores and each is formed with a longitudinal vane $v$ of a corresponding shape in cross section to the groove $g$ of the female rotor, both being formed substantially as set forth in my Patent 726,969 of May 5, 1903. A longitudinally extending T-shaped packing strip $b$, similar in form and arrangement to the packing strips $a$ of the female rotor, is mounted in a correspondingly formed groove in the crown of each vane, a spring $s^5$ being mounted under each end thereof. Each of said rotors 16, $16^a$ is provided with a shaft, 17, $17^a$, respectively, journaled in suitable bearings in the heads 8 and 9 and extending at one end to bearings in the bracket 2 through the gearbox 18 which is bolted to said bracket, within which are mounted the gears which gear the shafts 13, 17 and $17^a$ together. Radial packing strips $b'$ are mounted in grooves extending across the ends of said rotors 16, $16^a$, at right angles, one of said strips on each end being formed with a tongue on its outer end to engage a notch in the respective ends of the strip $b$. A packing ring $b^2$ is mounted on a spring $s^6$ in a recess surrounding the shaft of each of said rotors, being formed with radial notches to receive the inner ends of the strips $b'$. A spring $s^7$ is mounted under each strip $b'$ near its outer end. By this arrangement of packing strips in the ends and periphery of each rotor the leakage of steam from one expansion chamber to the other, or from an expansion chamber to an exhaust chamber is effectually prevented. By referring to Fig. 3 it will be noticed that two of the strips $a$ diametrically opposite each other will at all points during the revolution of rotor 12 be in contact with the wall of the casing containing said rotor, and thus, in connection with the intersecting end strips $a'$, form an effectual steam cut-off between the two sides of the engine.

The reversing valve 20 is mounted in the bore in the casing beneath the central rotor and is provided with a diagonal partition 21 midway of its length with a port on each side of said partition, one of which is adapted to communicate with the steam inlet port $p$ and the other with the steam exhaust port $p'$. Near each end said reversing valve is formed with ports $p^3$ which are adapted to communicate with a steam port 22 in the heads 8 and 9, leading into a chamber behind a transverse partition 50 and on either side of a longitudinal portion 51 in each head, from which the steam may pass through the ports 23 and 24 into the respective sides of the engine, for starting said engine, as will be presently described. Directly opposite the ports $p^3$ are formed ports $p^2$ which serve as ports for the escape of the exhaust steam from the exhaust end of the engine through the ports 22 therein. On the outer ends of said reversing valve, and beyond the partitions 50 in the heads it is formed of a smaller diameter in which portions it is provided with a series of ports, or slots, at suitable distances apart around its periphery which communicate through a port 25 with the main steam chamber 26 outside the partition 50 in the respective heads. On each of said ends is mounted a slotted thimble 27 and $27^a$, respectively, which are adapted to serve as a governor and throttle. The outside diameter being somewhat smaller than the main body of the valve and the bore for containing it the steam readily escapes through all said ports, when open to the port 25.

The thimble 27 has a shaft 28 extending through the head plate 10 and on its outer end is provided with a crank arm 29 which is connected to the reciprocating rod 30 of the governor G. Said governor is of a common or any appropriate form, driven by a belt 70 from a pulley 71 on shaft 17 through the usual shaft 72 and appropriate gearing. The thimble $27^a$ is sleeved onto shaft 32 of the valve, extends through the head plate 11 and is provided on its outer end with a hand wheel 31 by which it may be turned to adjust the area of the ports for throttling purposes. It will be understood, of course, that this may be connected by suitable devices to a throttling lever located at a distance, if desired. The shaft 32 on this end of valve 20 extends through the sleeve of thimble 27ª to the outside, and is provided with a lever 33 by which the said valve may be turned to reverse the engine, as by turning said valve from the position shown in Fig. 2 to the reverse position with the partition 21 standing at the opposite angle, the steam will be received in the right hand end of the engine and exhausted through the left hand end, as will be readily understood. A bracket 77 with suitable arms to serve as stops to limit the movement of said lever at the proper points is preferably mounted on the adjacent end of the engine casing. Ports 35 and 36 respectively are formed in the partitions 50 in the heads 9 and 10 and said ports lead into the chambers on each side of the longitudinal partition 51, respectively, and behind partition 50, in each head, which chambers terminate at their inner ends in the ports 23 and 24 respectively, of the form most clearly shown in Figs. 3 and 14, which lead into the respective sides of the engine. A controlling plate 37 is mounted on the shaft 13 of the female rotor at each end and adapted to rest against the outer face of partitions
50. They are formed with ports 38 38ª which, as the rotor revolves, pass alternately over the ports 35 and 36, each port 38 and 38ª admitting steam to the engine through said ports 35 and 36 first to one side, as through the port 23, and at the next half revolution to the other side, as through the port 24, while at the opposite end of the engine the steam thus admitted at the inlet end through the ports 36 and 24 is exhausted through the ports 35 and 23, while the steam admitted at the inlet end through the ports 35 and 23 is exhausted at opposite end through the ports 24 and 36. Each plate 37 is secured to the shaft 13 by means of a collar 40 which is securely clamped to said shaft and formed with an oblong recess in its face adapted to receive a correspondingly shaped hub on the adjacent face of said plate. See Figs. 2, 12 and 13. A stiff coiled spring 41 is interposed between the said hub and collar, one end engaging one of said parts and its other end the other. By this means the plates 37 are held by the steam pressure snugly to their seats on partitions 50 and being formed with perforations slightly larger than the shaft and with the oblong hub slightly smaller than the recess in the collar are not subject to its vibrations. The coiled springs 41 keep said plates to their seats regardless of the steam pressure and prevent any rattle or undue independent motion between the parts.

The heads 8 and 9 are of duplicate form, being castings cored out to form the different steam chambers and ports as before described. The chamber 26 outside the partition 50 in each head is a little larger in diameter than the plate 37. On the inside of said partition the space is divided into two chambers by the longitudinal partition 51, the port 35 through partition 50 communicating with one side and the port 35 with the other. The inner ends of these chambers terminate in the ports 23 and 24, which I have denominated "shoe-shaped," and are so located that the "heels" of the ports will cut into the bore of the engine casing occupied by the female rotor at diagonally opposite sides, while the "toe" will cut into the respective bores occupied by the male rotors, for the purpose to be presently described.

In Figs. 5 and 6 I have illustrated the bushing of the bearing-boxes for the shafts of the outside rotors 17 and 17ª. Said bushings C are mounted in the brasses C' and are cut along the lines $c$ formed with a slight opening $c'$ at the top leaving the outer side $C^2$ free to bend slightly. A set screw $c^2$ is mounted in one side of the box to bear against a spring $c^3$ on a bar $c^4$ and mounted in a recess in the side of the brass C' adjacent to said part $C^2$ of the bushing. By this means the bushing is held under pressure against the shaft of each side rotor and any space for the leakage of steam between the male and female rotors and any vibration or rattle of the shafts is prevented and their wear automatically compensated for. The tension of said springs may be regulated by set screw $c^2$. It will be understood, of course, that such adjustment is of such a slight character that it can be practically controlled in such a manner, it being only sufficient to provide against any looseness between the parts consequent upon the slight wear in the shaft bearings.

In Fig. 11 I have illustrated the preferred means of securing the gears on the shafts 13, 17 and 17ª within the gear-box 18, which consist in using clamping screws 60, extending through split hubs, to hold and adjust said gears to secure the rotors in the proper position relative to each other to secure perfect coöperation of the vanes and grooves therein. After this adjustment is secured a hole is drilled through the hub of each gear and shaft on which it is mounted and a tapered pin 61 driven through both parts to secure them absolutely in this position.

In operation, the parts being in position as shown in Fig. 2, the steam comes through the supply pipe 6, passes through the steam space in the casing surrounding the rotors and out the port $p$ into the left hand end of the reversing valve 20. Said valve is adjusted so that the port $p^3$ therein is in communication with the ports 22 leading into the chambers inside partition 50, from which it passes through ports 23 and 24 to each side of the engine and starts it. As soon as the engine is started reversing valve 20 is turned sufficiently to cut off the communication between the port $p^3$ and ports 22 and all of the steam then passes through the slots in the outer end of the reversing valve into the space surrounding it, which communicates through the port 25, with the steam chamber 26 outside of the partition 50. It then passes through the ports 38 and 39 in said plate through the ports 35 and 36 and 23 and 24 respectively to the opposite sides of the engine as said plate revolves, as will be readily understood. While two ports 38 and 39 are shown in plate 37 it will be understood that only one is sufficient to operate the engine as each port will admit steam to each side of the engine once at each revolution of the plate. But I prefer the two ports so that steam will be admitted to each side twice at each revolution. When the rotors are standing in the relative positions shown in Fig. 3 the expansion chamber on the left side of the engine is just opening between the groove of the female rotor and the vane of the male. The "heel" of the port 23 is of a form and is positioned to just register with this part of the chamber so as to admit steam at the moment it starts to open and thus exert its expansive force under conditions to secure the greatest power. As the rotors revolve the remainder of port 23 is uncovered into the expansion chamber. While live steam is coming into this narrow chamber at the top, or bottom side of the engine, as the case may be, live steam is also being admitted to the opposite side of the engine to the enlarged expansion chamber through the diagonally opposite port and adding its expansive force to the already partly spent steam therein and increasing the power of the engine. When but one port is used in plate 37 steam will be admitted to both sides of the engine only as the expansion chambers between the female and male rotors are opening. It will thus be seen that the female rotor forms the constant side to the two expansion chambers while the expansion of the steam against the adjacent sides of the vanes of the male rotors drives them in the same direction, and through gears on their shafts in the gear box 18 the power is communicated to the central shaft 13 of the female rotor, which thus becomes the power shaft. One side of the engine thus balances the other and minimizes the wear while securing the extreme limit of power. By means of the connection through rod 30 of the governor G the sleeve 27 will be oscillated as the speed of the engine increases or decreases to enlarge or contract the slots or ports in the end of the reversing valve and thus govern the speed of the engine automatically. When the engine is reversed, by turning valve 20 to the reverse position from that shown in Fig. 2, the steam can be throttled by the use of the thimble $27^a$ through lever 33, as before stated. The steam exhausts from the end of the engine opposite its inlet, through the ports 22 into the opposite end of the reversing valve and through the exhaust pipe 45.

Having thus fully described my said invention, what I claim as new, and desire to secure by Letters Patent, is:

1. In a rotary engine, the combination of the casing, three rotors mounted in longitudinal bores therein, the central rotor being grooved longitudinally and the side rotors provided with vanes adapted to mesh with said groove, packing strips mounted on each side of the groove in said central rotor in longitudinal grooves in the periphery thereof, packing strips also mounted in the ends of said rotor intersecting said packing strips in its periphery, a packing strip mounted in a longitudinal groove in the crown of the vane of each side rotor, transverse packing strips in grooves extending across the ends of said side rotors, the heads containing the steam chambers secured to each end of said casing containing the rotors, a steam inlet port leading through the casing to a reversing valve mounted in a chamber on one side of said casing, said reversing valve formed with ports leading into the chambers in the ends, and means for regulating the supply of steam through the ports leading to the engine, substantially as set forth.

2. A rotary engine comprising a casing containing longitudinal bores for a series of rotors mounted side by side therein, another bore for the reversing valve, the heads mounted on said casing containing the steam chambers, the reversing valve mounted in the bore provided therefor in said casing and extending into each head and formed with ports leading into said steam chambers, said reversing valve being divided and provided with a port communicating with a steam inlet on one side of its partition and with a port communicating with the steam exhaust on the other side, one end of said reversing valve being formed with a series of slots at intervals around its periphery upon which end is mounted a slotted thimble, said thimble provided with a crank-arm on its shaft, a rod connecting said crank-arm to the governor, and means for controlling the feed and exhaust of the steam to the opposite ends of the engine respectively, substantially as set forth.

3. A rotary engine comprising the casing formed with longitudinal bores to receive a series of rotors, a head mounted on each end thereof containing the steam chambers, head-plates mounted on said heads covering said chambers, a series of rotors mounted in the bores in said casing on shafts journaled in bearings in said heads, a cylindrical reversing valve mounted in a bore extending through said casing and said heads and provided with ports leading to the steam chambers in said heads, said reversing valve being divided by a partition and formed with a port communicating with the steam inlet on one side of the said partition and another port communicating with the steam exhaust on the other side, a governor mounted on the end of said reversing valve comprising a slotted thimble covering the ports in said reversing valve and connected with the governor, for regulating the size of said ports, and means for regulating the feed and exhaust of the steam to the opposite ends of the engine respectively, substantially as set forth.

4. A rotary engine comprising the casing, a series of rotors mounted in bores provided therefor in said casing, the heads mounted on each end of said casing and formed with steam ports and chambers for supplying and exhausting the steam to and from the expansion chambers of the engine respectively, a reversing valve mounted in said casing divided into two parts one of which communicates with the steam inlet and the other with the steam exhaust, ports leading from each end of said reversing valve into the steam chambers at the respective ends of the engine and a governor comprising an oscillating thimble mounted over the ports in one end of said reversing valve and connected to the governor mechanism and the other end provided with a throttling valve covering the ports comprising an oscillating thimble connected with means for operating it, substantially as set forth.

5. In a rotary engine, the combination of the casing provided with heads containing the steam ports and chambers, the rotors mounted in appropriate bores in said casing on shafts journaled in said heads, said shafts extending beyond said heads at one end and provided with inter-meshing gears which gear each side rotor to the shaft of the central rotor, a driving gear on the shaft of said central rotor, and valves for controlling and governing the inlet and exhaust of the steam to and from the expansion chambers of the engine, respectively, substantially as set forth.

6. A rotary engine comprising a casing formed with bores for a series of rotors and an oscillating reversing valve, heads on said casing formed with appropriate steam chambers and ports, the rotors mounted in said casing formed with inter-engaging vanes and grooves, the reversing valve mounted in its bore in said casing and formed with ports adapted to communicate with the ports and chambers in each head, said reversing valve being formed with a partition midway its length and a port on one side communicating with the steam inlet and another port on the other side communicating with the steam exhaust pipe, and a governing valve on the end of said reversing valve consisting of an oscillating thimble covering the slots therein and itself slotted, said thimble connected to the governor on the engine, by which it is operated, substantially as set forth.

7. A reversing valve for a rotary engine comprising a hollow cylinder forming part of the channel for conducting the steam to the engine and formed with a slotted end, an oscillating thimble slotted and mounted over the slotted end of said cylinder, the stem of said thimble projecting through the casing to the outside, a connection between said stem and the governor mechanism for operating said thimble, and said casing formed with a steam chamber surrounding said thimble, substantially as set forth.

8. In a rotary engine, the combination with the casing, rotors, and appropriate valves, of a reversing valve arranged to form part of the channel to conduct the steam to the engine and formed with ports or slots in its end through which the steam must pass, a slotted thimble mounted on said end over said slots and connected to the governor, and said governor, substantially as set forth.

9. In a rotary engine, the combination, of the casing, rotors therein, a reversing valve with a central partition arranged to receive the steam and conduct it to the engine on one side of said partition and to receive the exhaust steam on its other side and conduct it to the exhaust port, and formed with slotted ends communicating with the steam chambers in the heads, oscillating thimbles also formed slotted and mounted on said ends, and means for oscillating them, substantially as set forth.

10. In a rotary engine, the combination of the casing, rotors mounted in appropriate bores therein, valves for controlling the inlet and exhaust of steam and a reversing valve arranged in the path of the steam and formed with ports through its sides, a slotted thimble, or sleeve, mounted to cover said ports in said valve, the casing being formed with a steam space surrounding said thimble, or sleeve, and means for oscillating said thimble, or sleeve, to regulate the size of the ports, substantially as set forth.

11. A rotary engine comprising a casing, heads mounted on said casing, rotors in said casing, each of said heads being formed with a steam chamber and with ports leading therefrom to the expansion chambers between the central rotor and each side rotor, a controlling plate mounted on the shaft of the central rotor and covering said ports and itself formed with openings adapted to pass over said ports as the plate rotates with said shaft, the steam inlet pipe communicating with passage-ways leading to said steam chamber in one head, the steam exhaust pipe communicating with passage-ways leading to the steam chamber in the other head, and valves for controlling the inlet and exhaust of steam, substantially as set forth.

12. A rotary engine, the casing whereof is formed with suitable chambers for the rotors and valve mechanism, comprising rotors with inter-engaging vanes and grooves with expansion chambers between them, the ports leading into said expansion chambers being formed to cut into them on both sides the line defining the circumference of the central rotor, the valves and governing mechanism, substantially as set forth.

13. A rotary engine comprising a casing formed with intersecting longitudinal bores for containing the rotors, a series of rotors mounted in said bores having inter-engaging vanes and grooves, heads on said casing formed with steam chambers and ports leading from said chambers into the expansion chambers at the points of intersection between said bores and partly on each side thereof, and the steam controlling mechanism, substantially as set forth.

14. A rotary engine comprising a casing, rotors mounted in intersecting bores therein, heads on said casing formed with steam chambers and ports leading into the expansion chambers between the central rotor and each side rotor, the inner end of each of said ports being formed with a part to communicate with the groove of the central rotor adjacent to the point of intersection and with a part to communicate with the bore of the side rotor, and means for controlling the steam inlet and exhaust, substantially as set forth.

15. In a rotary engine, the combination, of a casing, heads thereon, rotors in said casing, said heads and casing being formed with appropriate steam inlet and exhaust ports, controlling valves, each head being divided by a partition into an outer chamber and two inner chambers terminating in ports leading into the expansion chambers between the central and side rotors, ports through said partition, and a plate with openings adapted to pass over said ports mounted on the shaft of the central rotor and secured thereto to permit a slight independent movement, substantially as set forth.

16. A rotary engine comprising a casing provided with suitable inlet and exhaust ports and chambers, a reversing valve forming a part of the channel through which the steam passes to the engine provided with ports leading into an inner chamber communicating direct with the expansion chambers of the engine and other ports, or slots, in its end communicating with an outer chamber with ports leading into said inner chamber controlled by appropriate valve mechanism, said valve mechanism, an oscillating sleeve surrounding said end of said reversing valve and covering said ports or slots, a connection therefrom to the governor mechanism, and means for rocking said reversing valve independent of said governor mechanism to open or close the ports therefrom to said inner chamber leading direct to the expansion chamber, substantially as set forth.

17. A rotary engine comprising a casing containing the rotors and formed with suitable ports and chambers for the inlet and exhaust of the steam, said rotors, valve mechanism for controlling said ports and chambers, and a reversing valve forming a part of the channel for the inlet of the steam to the engine and also for the exhaust of the steam from the engine, said reversing valve being formed at each end with two sets of ports the inner ports being arranged to communicate with a direct passage to the expansion chambers of the engine and the outer ports arranged to communicate with the outer chambers connecting with said expansion chambers through suitable ports controlled by valve mechanism, said valve mechanism, means for rocking said reversing valve to open or close the ports into the direct passage to the expansion chambers, and means for regulating the size of the ports communicating with the outer chambers, substantially as set forth.

18. A rotary engine comprising a casing containing vaned and grooved rotors with expansion chambers between their adjacent sides and formed with suitable steam inlet and exhaust ports and chambers, said rotors, valve mechanism for controlling the inlet and exhaust of the steam, the inlet ports being arranged to lead into the expansion chambers at diagonally opposite sides of the axis of the central rotor at one end of the engine and the exhaust ports being arranged to lead from the expansion chambers at diagonally opposite sides of the axis of the central rotor at the opposite end of the engine, substantially as set forth.

19. A rotary engine comprising a casing, heads thereto, rotors mounted in bores in said casing on shafts extending through bearings in said heads, the bearings for the side rotors being provided with inwardly adjustable bushings, whereby they are held in constant relation to the central rotor regardless of wear, said casing and heads being formed with appropriate steam inlet and exhaust ports, and valve controlling mechanism, substantially as set forth.

20. A rotary engine comprising a casing, heads thereon, appropriate steam inlet and exhaust ports being formed in said casing and heads, suitable valve mechanism, and rotors in said casing mounted on shafts extending through bearings in said heads, said bearings being formed with bushings formed with their outside portions adapted to bend inwardly, and means for bending them, whereby the wear of the shaft and bushing may be compensated for and the constant relation of the rotors maintained, substantially as set forth.

21. A rotary engine comprising a casing containing vaned and grooved rotors with expansion chambers between their adjacent sides and formed with appropriate steam ports and chambers, valve mechanism for controlling the inlet and exhaust of the steam, the inlet to each expansion chamber being at one end of the engine and the exhaust from said expansion chamber at the other end of the engine, said inlet and said exhaust being one on one side and the other on the diametrically opposite side of the plane of the axes of the rotors, substantially as set forth.

22. A rotary engine comprising a casing containing vaned and grooved rotors with expansion chambers between their adjacent sides and formed with appropriate steam ports and chambers, valve mechanism for controlling the inlet and exhaust of the steam, the inlets to said expansion chambers being at one end of the engine and the exhausts from said expansion chambers at the other end of the engine, said inlets and said exhausts being on diametrically opposite sides of the center rotor but reversed, substantially as set forth.

23. A rotary engine comprising a casing formed with appropriate steam ports and chambers, steam controlling mechanism, and rotors mounted in said casing, the central rotor formed with a longitudinal groove and having packing strips extending longitudinally ninety degrees apart in its periphery, two of said strips being equi-distant from each side of said groove, radial packing strips mounted in the ends of said rotor to intersect said strips in its periphery and a packing ring being mounted around the shaft engaging the ends of said radial strips, the side rotors being provided with similar end packing and one longitudinal strip in the crown of their respective vanes, substantially as set forth.

24. A rotary engine comprising a casing formed with bores for the rotors and with appropriate steam inlet and exhaust ports and chambers, said rotors, the steam inlet ports comprising a passage in said casing entirely surrounding the bores for said rotors which passage communicates on one side with the steam inlet supply pipe and at another point with a port in a hollow cylindrical reversing valve which leads therefrom to the chambers communicating with the inlet end of the expansion chambers between the rotors, and appropriate valve mechanism for controlling the inlet and exhaust of the steam, substantially as set forth.

25. In a rotary engine, the combination of the casing formed with bores for the rotors and with appropriate ports and chambers for the inlet and exhaust of the steam, vaned and grooved rotors mounted in said bores, appropriate valve mechanism for controlling the inlet and exhaust of the steam through said ports and chambers, the inlet ports comprising a passage from the live steam supply pipe surrounding the bores for the rotors and a hollow rotary reversing valve divided into two parts at an intermediate point the inner end of each part being formed with a port adapted to communicate with the passage surrounding said rotors and its outer end formed with ports leading therefrom into chambers communicating with the inlet end of the expansion chambers, the other part of said reversing valve being formed at its outer end with ports communicating with the exhaust end of said expansion chambers and at its inner end with a port adapted to communicate with an exhaust pipe, substantially as set forth.

26. A rotary engine comprising a casing formed with bores for the rotors and with appropriate ports and chambers for the inlet and exhaust of the steam, appropriate valve mechanism for controlling the inlet and exhaust of the steam, and three rotors of equal diameter mounted in the same plane in the bores in said casing adapted to rotate with the surfaces of the side rotors adjacent to the opposite sides of the central rotor, said side rotors being each formed with a longitudinal vane and said central rotor being formed with a single longitudinal groove of corresponding form in cross section the longitudinal vane of each side rotor being arranged to mesh with and snugly fit within said longitudinal groove of the central rotor and the side bores being of a diameter sufficiently larger than the diameter of the central bore to accommodate said vanes, substantially as set forth.

In witness whereof, I, have hereunto set my hand and seal at Greensburg, Pennsylvania this 1st day of February, A. D. nineteen hundred and nine.

NEWELL H. MOTSINGER. [L. S.]

Witnesses:
LEWIS W. WHITMORE,
WILLIAM D. GRAFF.